(12) United States Patent
Gupta

(10) Patent No.: US 10,956,426 B2
(45) Date of Patent: *Mar. 23, 2021

(54) CLASSIFICATION FOR ASYMMETRIC ERROR COSTS

(71) Applicant: Airbnb, Inc., San Francisco, CA (US)

(72) Inventor: Alok Gupta, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,351

(22) Filed: Jun. 11, 2019

(65) Prior Publication Data

US 2019/0294612 A1    Sep. 26, 2019

Related U.S. Application Data

(63) Continuation of application No. 14/968,750, filed on Dec. 14, 2015, now Pat. No. 10,360,220.

(51) Int. Cl.
| | |
|---|---|
| *G06F 16/2457* | (2019.01) |
| *G06N 5/04* | (2006.01) |
| *G06N 20/00* | (2019.01) |
| *G06F 16/2455* | (2019.01) |
| *G06Q 30/02* | (2012.01) |

(52) U.S. Cl.
CPC .... *G06F 16/24575* (2019.01); *G06F 16/2455* (2019.01); *G06N 5/045* (2013.01); *G06N 20/00* (2019.01); *G06Q 30/02* (2013.01)

(58) Field of Classification Search
CPC .......... G06F 16/24575; G06F 16/2455; G06N 20/00; G06N 5/045; G06Q 30/02
See application file for complete search history.

(56) References Cited

U.S. PATENT DOCUMENTS

| | | |
|---|---|---|
| 10,360,220 B1 | 7/2019 | Gupta |
| 2010/0205123 A1 | 8/2010 | Sculley et al. |
| 2015/0379425 A1 | 12/2015 | Dirac et al. |
| 2016/0253801 A1 | 9/2016 | Linard et al. |
| 2017/0154282 A1 | 6/2017 | Rossi et al. |

OTHER PUBLICATIONS

Chen et al., Asymmetric Self-Learning for Tackling Twitter Spam Drift, The Third International Workshop on Security and Privacy in Big Data (BigSecurity 2015), pp. 208-213 (Year: 2015).*

(Continued)

*Primary Examiner* — Alan Chen
(74) *Attorney, Agent, or Firm* — Fenwick & West LLP

(57) ABSTRACT

A behavior detection module constructs a random forest classifier (RFC) that takes into account asymmetric misclassification costs between a set of classification labels. The classification label estimate is determined based on classification estimates from the plurality of decision trees. Each parent node of a decision tree is associated with a condition of an attribute that splits a parent node into two child nodes by maximizing an improvement function based on a training database. The improvement function is based on an asymmetric impurity function that biases the decision tree to decrease the error for a label with high misclassification cost over the other, at the cost of increasing the error of the other label with a lower misclassification cost.

17 Claims, 7 Drawing Sheets

(56) References Cited

OTHER PUBLICATIONS

Koh, Learning from Asymmetric Models and Matched Pairs, Dissertation, Arizona State University, May 2013, Total pp. 154 (Year: 2013).*

Canovas-Garcia et al., "Optimal Combination of Classification Algorithms and Feature Ranking Methods for Object-Based Classification of Submeter Resolution Z/1-Imaging DMC Imagery," Remote Sensing, vol. 7, Apr. 17, 2015, pp. 4651-4677.

Chakraborty et al., Spam Mail Filtering Technique using Different Decision Tree Classifiers through Data Mining Approach—A Comparative Performance Analysis, Jun. 2012, International Journal of Computer Applications, VI. 47, pp. 26-31 (Year: 2012).

Drummond et al., Exploiting the Cost (in)sensitivity of Decision Tree Splitting Criteria, AAAI Technical Report WS-00-05, www.aaai.org, 2000 (Year: 2000).

Grabczewski, "Chapter 2, Techniques of Decision Tree Induction," Meta-Learning in Decision Tree Induction, 2014, pp. 11-117.

He et al., Asymmetric Gradient Boosting with Application to Spam Filtering, CEAS, 2007. (Year: 2007).

Narsky, I. et al., Statistical Analysis Techniques in Particle Physics, Chapter 4: Classification: Basic Concepts, Decision Trees, and Model Evaluation, 2013, 61 pages, [Online] [Retrieved on Mar. 14, 2016] Retrieved from the internet <URL:https://www-users.cs.umn.edu/-kumar/dmbook/ch4.pdf>.

Tran, Improving Random Forest Algorithm through Automatic Programming, Master Thesis in Computer Science, Ostfold University College, May 15, 2015, 126 pages.

United States Office Action, U.S. Appl. No. 14/968,754, dated Nov. 16, 2018, 29 pages.

Zhang et al., Binary PSO with mutation operator for feature selection using decision tree applied to spam detection, 2014, Elsevier,Knowledge-Baseds Systems vol. 64, pp. 22-31 (Year: 2014).

United States Office Action, U.S. Appl. No. 14/968,750, dated Nov. 8, 2018, 13 pages.

* cited by examiner

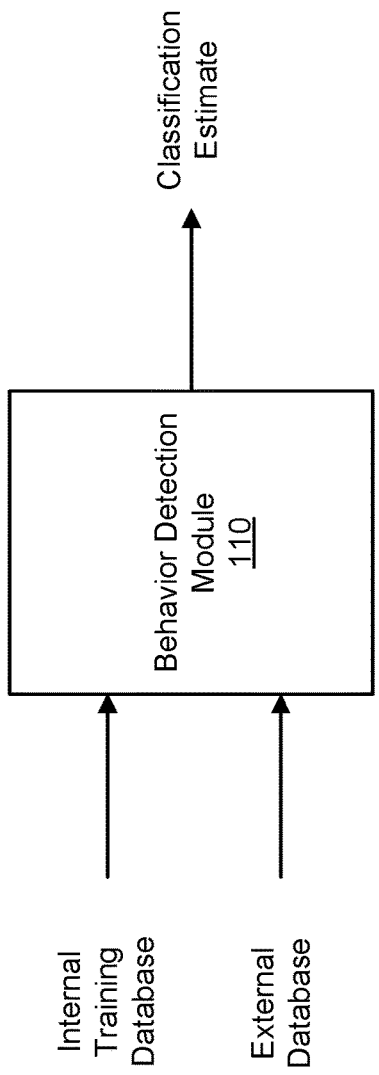

Classification Based on Equally Weighted Misclassification Costs

| Attribute 1 | Attribute 2 |
|---|---|
| 0 | England |
| 1 | England |
| 0 | France |
| 1 | China |
| 1 | China |
| 1 | France |
| 0 | France |
| 0 | England |

. . .

| Attribute P | Estimate | True |
|---|---|---|
| 44 | 1 | 0 |
| 20 | 1 | 1 |
| 32 | 1 | 1 |
| 65 | 1 | 1 |
| 64 | 0 | 0 |
| 72 | 0 | 0 |
| 18 | 0 | 0 |
| 17 | 0 | 1 |

FIG. 2A

Classification Based on Asymmetric Misclassification Costs

| Attribute 1 | Attribute 2 |
|---|---|
| 0 | England |
| 1 | England |
| 0 | France |
| 1 | China |
| 1 | China |
| 1 | France |
| 0 | France |
| 0 | England |

. . .

| Attribute P | Estimate | True |
|---|---|---|
| 44 | 0 | 0 |
| 20 | 1 | 1 |
| 32 | 1 | 1 |
| 65 | 0 | 1 |
| 64 | 0 | 0 |
| 72 | 0 | 0 |
| 18 | 0 | 0 |
| 17 | 0 | 1 |

FIG. 2B

CLASSIFICATION FOR ASYMMETRIC ERROR COSTS

CROSS REFERENCE TO RELATED APPLICATIONS

This application is a continuation of prior, co-pending U.S. application Ser. No. 14/968,750, filed on Dec. 14, 2015, which is incorporated by reference herein in its entirety for all purposes.

BACKGROUND

Field of Disclosure

The present invention generally relates to classification of database entries, and more specifically to classification of database entries with asymmetric misclassification costs.

Description of the Related Art

Classification of data entries is one of the most useful techniques in data science. Given a series of characteristic attributes of a data entry, classification aims to label the entry into one out of multiple classification labels. For example, an entity running a mail server may want to classify whether an incoming message in a user's inbox is spam or not given a words in the message. As another example, an entity running a website for user transactions may want to classify whether a user is committing fraud on the website given the user's profile, his or her history of transactions, and reviews of the user from other user's on the website.

Well-known classification methods include support vector machines, naïve Bayes classifiers, and random forests. A random forest classifier (RFC) is an ensemble method involving a collection of individual decision trees, and classifies a data entry by testing the entry through a sequence of attribute conditions. Decision trees provide an easy an intuitive way of interpreting the classification of data entries and may be easier to construct than other classifiers of comparable performance.

Often times, misclassification has different cost consequences for each classification label. For example, labeling a spam message as a regular message causes inconvenience for the user of moving the message into a trash inbox. However, labeling a regular message as a spam message, and moving the message into a spam inbox without the user reading the message may cause the user to miss an important piece of communication. The misclassification of regular messages as spam messages generate a greater cost compared to misclassification of spam messages as regular messages for the entity running the mail server.

The decision trees that make up a RFC are constructed based on a symmetric impurity function that equally weighs the misclassification costs of each classification label. Thus, the symmetric impurity functions do not allow construction of decision trees that take into account different error cost consequences for each classification label.

SUMMARY

A behavior detection module constructs a random forest classifier (RFC) that takes into account asymmetric misclassification costs between a set of classification labels. The RFC includes a plurality of decision trees and generates a classification label estimate for a data entry with a plurality of attributes. The classification label estimate is determined based on classification estimates from the plurality of decision trees. Each parent node of a decision tree is associated with a condition of an attribute that directs the data entry to a corresponding child node depending on whether the condition is satisfied or not. The data entry is directed through the tree to one out of a set of leaf nodes, and a classification label associated with the leaf node.

Each attribute condition that splits a parent node into two child nodes is selected by maximizing an improvement function based on a training database. A plurality of test attribute conditions that correspond to a plurality of splits of the training database is generated. The split that generates the maximum value of an improvement function is selected as the attribute condition for the parent node. The improvement function is based on an impurity function that measures how predominant a classification label is in a training database partition at a node. The behavior detection module uses an asymmetric impurity function that biases the decision tree to decrease the error for a label with high misclassification cost over the other, at the cost of increasing the error of the other label with a lower misclassification cost.

BRIEF DESCRIPTION OF DRAWINGS

FIG. 1A is a block diagram of a behavior detection module, according to one embodiment.

FIG. 1B illustrates a general structure of a database entry.

FIG. 2A illustrates database classification with equally weighted misclassification costs.

FIG. 2B illustrates database classification by the behavior detection module with asymmetric misclassification costs.

DETAILED DESCRIPTION

Figure 3:
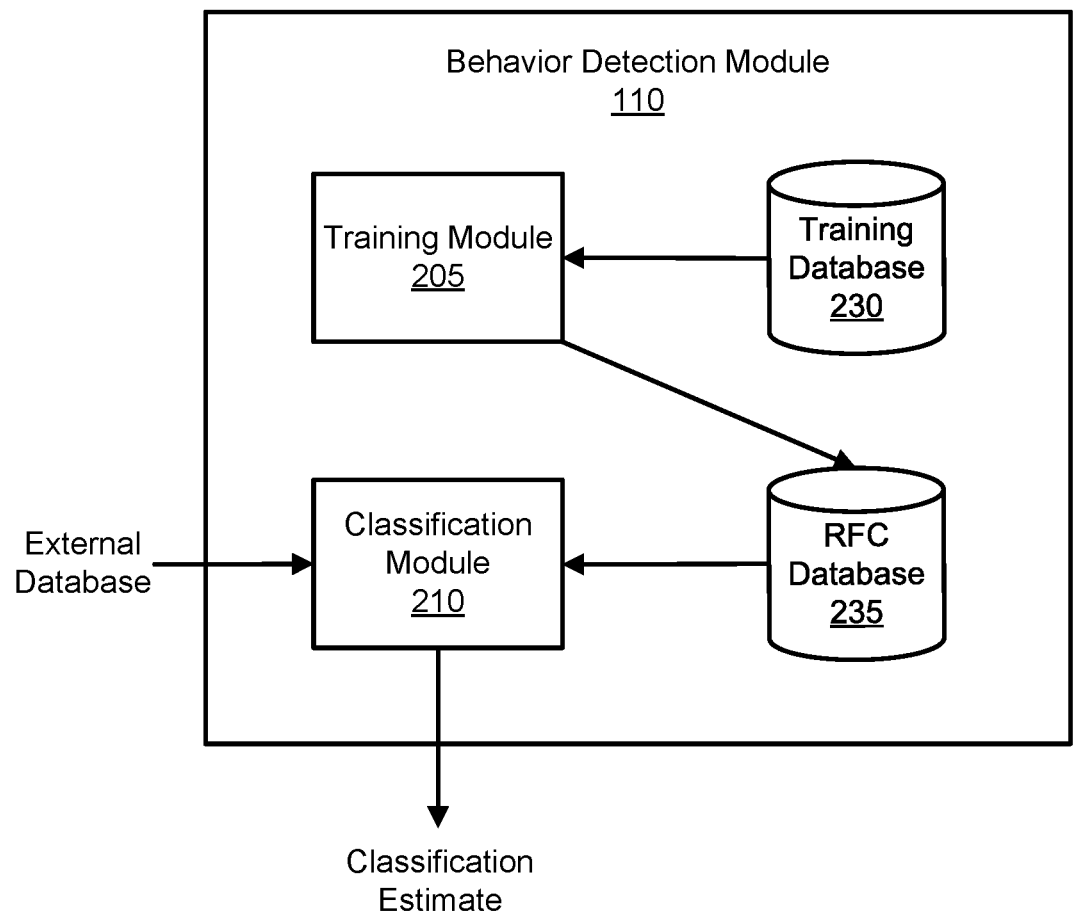
FIG. 3 is a block diagram illustrating modules within the behavior detection module, according to one embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Overview

FIG. 1A is a block diagram of a behavior detection module 110 according to one embodiment. The behavior detection module 110 constructs a classifier that labels a given data entry into one of multiple classification labels by taking into account different misclassification costs for each label, and is one means for doing so. The behavior detection module 110 constructs the classifier based on an internal training database with a collection of data entries, in which each data entry is labeled with one out of multiple classification labels. The behavior detection module 110 then applies the trained classifier to an external database with a collection of unlabeled data entries, and generates classification label estimates for each entry in the external database. In one particular embodiment referred to throughout the remainder of the specification, the behavior detection module 110 labels a data entry into one of two classification labels, also referred to as a binary classification. It is appreciated, however, that in other embodiments, the behavior detection module 110 may select a classification label from three or more labels.

FIG. 1B illustrates a general structure of a database entry processed by the behavior detection module 110. Each entry has a series of P attributes $x_1, x_2, \ldots, x_P$, that characterize the data entry as a unique entry. For example, an entity operating a website that hosts user transactions may want to detect which users are fraudulent. As shown in FIG. 1B, a database of user profiles may contain relevant attributes such as the age, region, gender of a user, as well as whether the user has previously committed fraud, or whether a user has been reported by other users as a fraudulent user.

The attributes in the database may be numerically continuous or discrete values, or categorical values. As shown in FIG. 1B, Attribute 1 is a numerically discrete value indicating for example, whether a user has previously committed fraud (value "1"), or whether a user has never committed fraud (value "0"). Attribute 2 is a categorical value indicating the nationality of the user. Attribute P is a numerically continuous value indicating for example, the age of the user.

A data entry may be associated with one among a set of classification labels, in which each classification label represents a category that is of interest to a user of the behavior detection module 110. Returning to the example in FIG. 1B, Users 1 and 2 are associated with label "1" that indicates, in a hypothetical use case, that the users are fraudulent users of a computing system (not shown). User 3 is associated with label "0" that indicates for example, that the user is non-fraudulent user of the computing system.

A classification label for a data entry may be previously verified to be associated with the entry, or may be an estimate of the category associated with the entry. In an internal training database used by the behavior detection module 110 to construct the classifier, each entry may be flagged with a classification label that is already verified to be associated with the entry. Returning to the example of user fraud of a computing system, in this example associated with a user transaction website, the human administrator operating the user transaction website may have a list of users that are confirmed to have committed fraud. The entity may label the corresponding user profiles as fraudulent ("1") and include these entries in a training database. In an external database that contains data entries with unknown labels, the behavior detection module 110 may want to infer the labels associated with each entry. For example, given a list of current users, the entity of the user transaction website may want to estimate which users are likely committing fraud. The entity may, for example, use the estimated labels to monitor certain users for fraudulent activity more than others. Each estimated classification label in the external database is prone to error, as the behavior detection module 110 cannot always know for certain (without separate, presumed unavailable, evidence) that a user is engaging in fraudulent activity.

The behavior detection module 110 constructs the classifier based on attribute patterns that are present in classification labels in the training database. Some attributes may be a more relevant indicator of a classification label than others, and may contribute more in determining whether a data entry is associated with a label. Returning to the example in FIG. 1B, Attribute 1, indicating whether a user has previously committed fraud, may be a stronger indicator than the country of a user in detecting fraudulent users. The behavior detection module 110 then applies the trained classifier to an external database, and generates classification label estimates for each entry in the external database.

FIGS. 2A and 2B illustrate different database classifications that may be performed by the behavior detection module 110 depending upon the misclassification costs used to perform the classification. FIG. 2A illustrates database classification with equally weighted misclassification costs. FIG. 2B illustrates database classification by the behavior detection module 110 with asymmetric misclassification costs. As shown in FIG. 2A, User 1 is mislabeled as "1," or as a fraudulent user, when he or she is actually a non-fraudulent user. A second type of misclassification occurs for User 8, in which User 8 is mislabeled as "0," or as a non-fraudulent user, when he or she is actually a fraudulent user. As above, one type of misclassification may have a higher cost than the other. Labeling a non-fraudulent user as fraudulent may be more costly as the user's account may be suspended from transactions that generate income for the user, even though the user has not participated in any fraudulent activity. Thus, weighting each type of misclassification error equally may not be optimal, depending on the external impact of the error.

The behavior detection module 110 constructs a trained classifier that takes into account asymmetric misclassification costs. As shown in FIG. 2B, the behavior detection module 110 biases the trained model such that an increasing number of classification label estimates "0" are generated than the example in FIG. 2A. The bias creates an increase in the proportion of errors for entries that actually have a label of "1," and a decrease in the proportion of errors for entries that actually have a label of "0," as shown in Users 4 and 8. Thus, since the misclassification cost for label "0" users is higher, the behavior module 110 biases the trained classifier to decrease the error rate for label "0" users, at the cost of increasing the error rate for label "1" users.

Behavior Detection Module

FIG. 3 is a block diagram illustrating modules within the behavior detection module 110, according to one embodiment. The behavior detection module 110 includes a training module 205, a classification module 210, training database 230, and an RFC database 235. Some embodiments of the behavior detection module 110 have different or additional modules than the ones described here. Similarly, the functions can be distributed among the modules in a different manner than is described here. Certain modules and functions can be incorporated into other modules of the behavior detection module 110.

The training module 205 generates a random forest classifier (RFC) that takes into account asymmetric misclassification costs and stores it in RFC database 235, and is one means for doing so. The classification model is constructed using an internal training database 230. Depending on the misclassification costs for each classification label, the training module 205 generates a RFC that decreases the error rate for the label with higher cost compared to a case with equal misclassification costs.

The classification module 210 applies the trained RFC in RFC database 235 to an external database and generates a classification estimate for each entry in the database, and is one means for doing so. The external database includes entries without known classification labels. The classification module 210 is described further in Section "Classification Using the Trained RFC."

Figure 4:
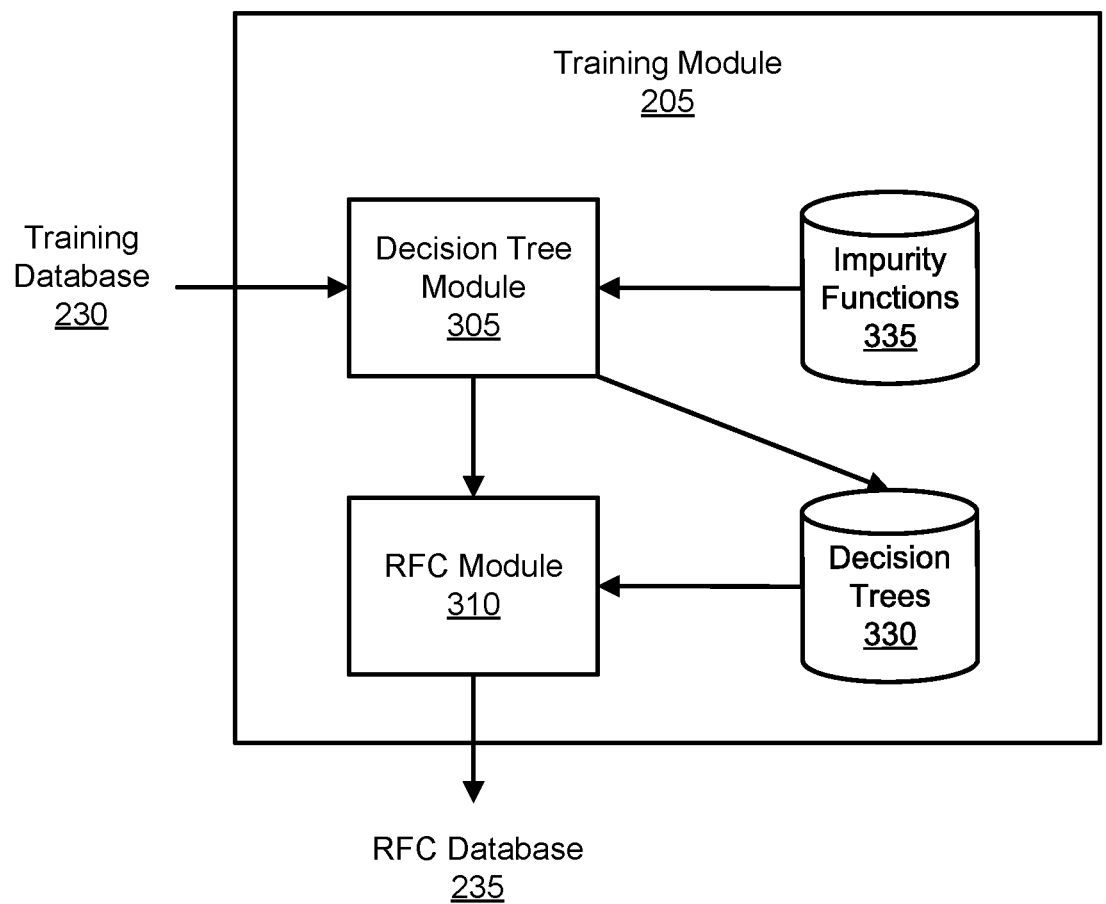
FIG. 4 is a block diagram illustrating the training module implemented by the behavior detection module, according to one embodiment.

FIG. 4 is a block diagram illustrating the training module 205 implemented by the behavior detection module 110, according to one embodiment. The training module 205 includes a decision tree module 305, a RFC module 310, decision trees 330, and impurity functions 335. Some embodiments of the training module 205 have different or additional modules than the ones described here. Similarly, the functions can be distributed among the modules in a different manner than is described here. Certain modules and functions can be incorporated into other modules of the training module 205.

The decision tree module 305 trains a plurality of decision trees, each of which is designed to generate a classification estimate, and stores them in decision trees 330, and is one means for doing so. In one particular embodiment referred to throughout the remainder of the specification, the decision tree module 305 trains at least two and commonly many more binary decision trees. The decision trees are distinct depending on for example, the size of the tree, the type and number of attributes used in constructing the tree. The decision tree module 305 uses one or more impurity functions 335 to construct each decision tree from training data 230. The impurity functions 335 measures the degree of separation between partitions of the training database 230 according to the distribution of classification labels in each partition. For example, a partition of the training database 230 with equal proportions of "0" and "1" labeled entries would have a higher impurity than a partition of the training database 230 with all "1" labeled entries. A more detailed description of impurity functions 335 will be provided below in conjunction with FIGS. 6A and 6B.

The training process and construction of an individual decision tree is described further in Section "Decision Tree Example."

Decision Tree Example

Figure 5:
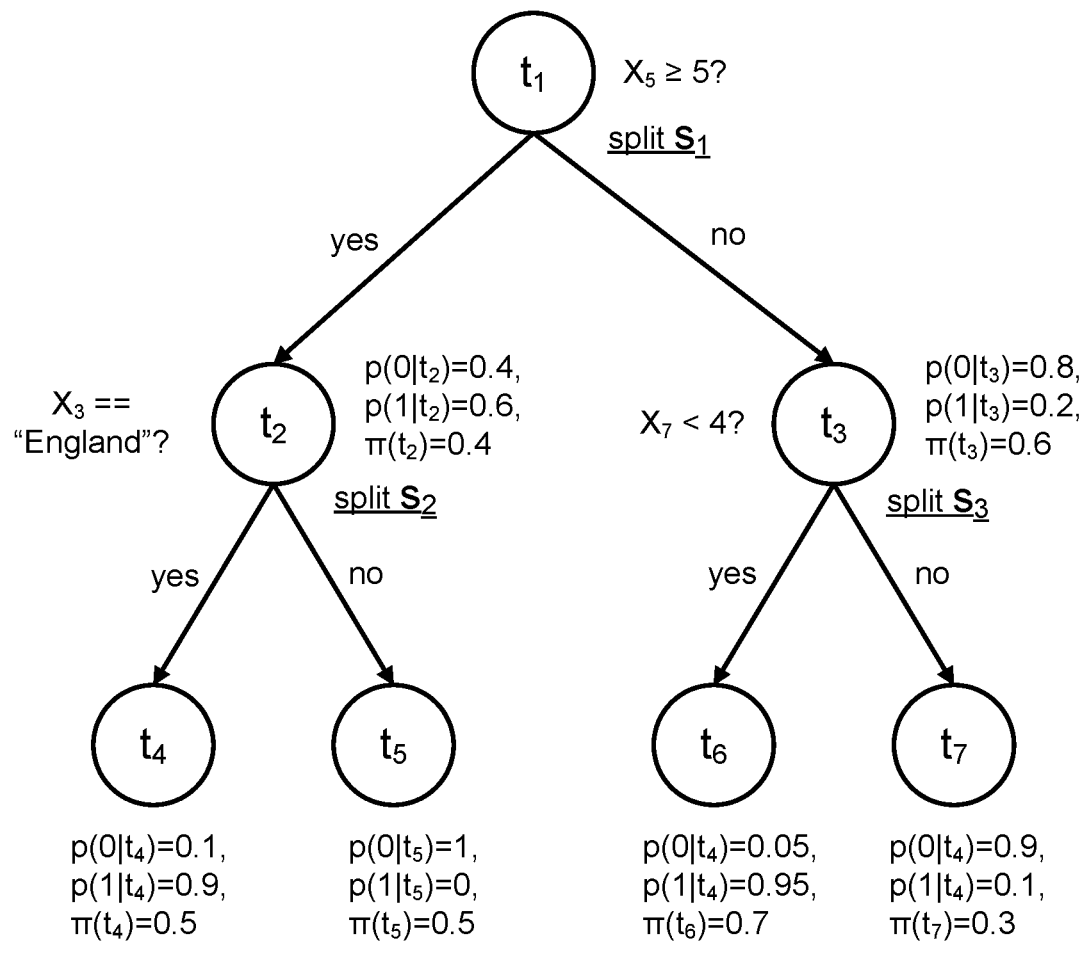
FIG. 5 is an example diagram of training a decision tree, according to one embodiment.

FIG. 5 is an example diagram of training a decision tree, according to one embodiment. Each decision tree includes a hierarchical structure with a plurality of T nodes $t_1, t_2, \ldots t_T$ and a plurality of directed edges between a parent node and a child node. A parent node is a node that has outgoing edges to a child node, and a child node is a node that receives edges from a parent node. In the particular embodiment of a binary decision tree, each parent node has two child nodes. The nodes are one among a root node, in which the node has no incoming edges, an internal node, in which the node has one incoming edge with two outgoing edges, and a leaf node, in which the node has one incoming edge with no outgoing edges. For example, the example decision tree in FIG. 5 has seven nodes $t_1, t_2, \ldots, t_7$ and six edges. $t_1$ is the root node, $t_2$ and $t_3$ are internal nodes, and $t_4$-$t_7$ are leaf nodes.

Each node except the root node corresponds to a partition of database entries formed by a split s at a parent node. The split s at the parent node is based on a test condition of an attribute of the training database 230 that compares an attribute value of an entry to a reference value, and verifies whether the attribute value meets that condition or not.

Returning to the example in FIG. 5, node $t_1$ creates a split $s_1$ into two child nodes $t_2$ and $t_3$ based on the test condition $x_5 \geq 5$, which checks if an entry contains a fifth attribute value equal to or greater than 5. The training database 230 is split at $s_1$ into one partition that contains entries with $x_5 \geq 5$, and another partition that contains entries with $x_5 \leq 5$. The former partition is directed to child node $t_1$ and the latter partition is directed to child node $t_2$. As described below, the decision tree module 305 may try various test conditions to select the optimal partition of the database at the parent node. As shown in FIG. 5, if the condition $x_5 \geq 5$ at the parent node $t_1$ is determined to be optimal for that layer of the decision tree, the partition of the training database 230 with the condition $x_5 \geq 5$ is further split at $s_2$ into two child nodes $t_4$ and $t_5$, based on the test condition $x_3 ==$"England." Thus, the entries at the node $t_4$ would satisfy both conditions $x_5 \geq 5$ and $x_3 ==$"England."

The decision tree module 305 generates a layer of child nodes at a parent node by determining an optimal condition of an attribute that maximizes an improvement function at the split s of the parent node. The optimal condition is in general, one where one partition predominantly has entries with one classification label (e.g., "0"), and the other partition predominantly has entries with the other classification label (e.g., "1"). The decision tree module 305 generates various partitions of the training database 230 based on various attribute test conditions, calculates an improvement metric from the improvement function, and selects the attribute condition with the highest improvement metric as the condition for the split s.

Returning to the example in FIG. 5, the decision tree module 305 at node $t_1$ may generate test partitions based on $x_5 \geq 5$, as well as $x_5 \geq 5.1$, $x_5 \geq 5.2$, $x_5 \geq 5.3$, and so on. The test partition that maximizes the improvement function is chosen as the condition for split $s_1$ of the tree. In one embodiment, the decision tree module 305 may randomly select a subset of attributes and generate test partitions based on the subset of selected attributes. In another embodiment, the decision tree module 305 may use a dimensionality reduction method such as principal component analysis (PCA) to combine attributes and use the combined attributes to construct the decision tree.

The improvement function quantifies the gain in separation of classification labels by further splitting a subset of the training database 230 at a parent node into child nodes, according to a test condition. The improvement function is based on an impurity function that measures the "purity" of a test partition, or how predominant one classification label is among the entries in the partition. The impurity function retains a low value when a partition includes a high proportion of entries from one classification label. Returning to the example in FIG. 5, p(0|t) denotes the proportion of entries at node t with classification label "0," and p(1|t) denotes the proportion of entries at node t with classification label "1." Node $t_5$ predominantly has entries with classification label "0," and retains a very low degree of impurity. In contrast, node $t_2$ has a higher degree of impurity since the partition contains an almost equal combination of entries with both classification labels "0" and "1."

The decision tree module 305 completes the construction of a trained decision tree when it determines the leaf nodes of the decision tree. Each leaf node is associated with a classification label. The decision tree module 305 may stop generating child nodes in the tree when the maximum of an improvement function for a split is less than a predetermined threshold, and select the last layer of nodes as the leaf nodes. As another example, the decision tree module 305 may grow a large decision tree with many layers and use a validation database to reduce or prune the size of the tree. Each leaf node is assigned a classification label that has a dominant proportion in the corresponding partition at the leaf node. In FIG. 5, leaf node $t_4$ is assigned label "1," since $p(1|t_4)$ is greater than $p(1|t_4)$ in the partition at node $t_4$. As will be discussed in further detail later in conjunction with the classification module 210, an external data entry to be labeled is assigned to one of the leaf nodes, and the classification label associated with the leaf node.

The improvement function $\Delta i(s,t)$ for a test partition at node t for a split s may be given by:

$$\Delta i(s,t) = i(t) - \pi(l) \cdot i(l) - \pi(r) \cdot i(r)$$

where $i(t)$ is the impurity function for node t, $i(l)$ is the impurity function for the potential left child node of node t, $i(r)$ is the impurity function for the potential right child node of node t, $\pi(l)$ is the proportion of data entries sent to the left node from node t, and $\pi(r)$ is the proportion of data entries sent to the right node from node t. The improvement function above measures the decrease in impurity if a subset of the training database 230 at node t were to be split at s into child nodes l and r. The improvement function $\Delta i(s,t)$ is maximized when the impurity function of the potential left and right child nodes are minimized. In other embodiments, the improvement function may be given by other impurity function-based functions, such as information gain, likelihood ratio, gain ratio, distance measure, and the DKM criterion, etc.

The impurity function $i(t)$ for a partition at node t may be given by the symmetric Gini impurity $i_G(t)$:

$$i_G(t) = p(0|t) \cdot (1-(0|t)) + p(1|t) \cdot (1-p(1|t)).$$

Figure 6A:
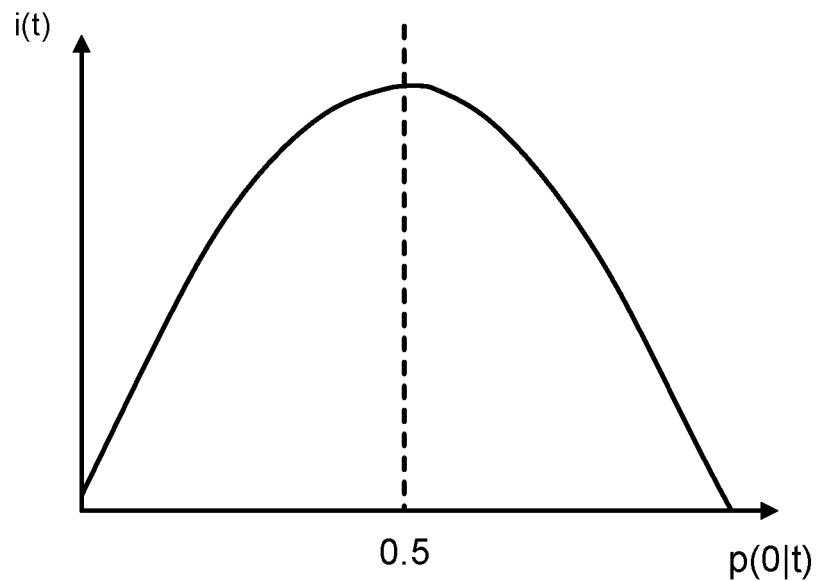
FIG. 6A illustrates a symmetric Gini impurity function, according to one embodiment.

FIG. 6A conceptually illustrates a symmetric Gini impurity function. As shown in FIG. 6A, the Gini impurity is a symmetrical function and retains a maximum value when $p(0|t) = p(1|t) = 0.5$, or when there is an equal proportion of entries from each classification label assigned to each child node. Returning to the example decision tree in FIG. 5, node $t_2$ has a higher Gini impurity than node $t_3$, since $i_G(t_2) = 0.48$ and $i_G(t_3) = 0.32$.

Figure 6B:
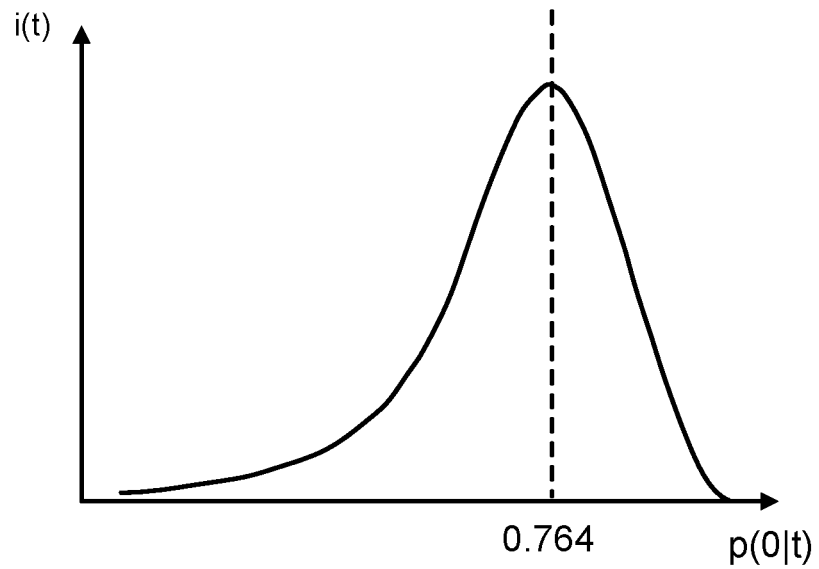
FIG. 6B illustrates an example asymmetric impurity function according to one embodiment, for values of a=5, b=1, c=1, and d=1.

In another embodiment, the impurity function $i(t)$ at node t may be given by the asymmetric impurity $i_A(t)$:

$$i_A(t) = 0.25 \cdot \frac{p(0|t)^a \cdot p(1|t)^b}{\max_{[0,1]}\{p(0|t)^a \cdot p(1|t)^b\}} + 0.25 \cdot \frac{p(1|t)^c \cdot p(0|t)^d}{\max_{[0,1]}\{p(1|t)^c \cdot p(0|t)^d\}}$$

where a, b, c, and d are predetermined constants that determine the shape of the impurity function. FIG. 6B illustrates an example asymmetric impurity function according to one embodiment, for values of a=5, b=1, c=1, and d=1. As shown in FIG. 6B, the asymmetric impurity function retains a maximum value when $p(0|t)=0.764$, compared to $p(0|t)=0.5$ in the symmetric Gini impurity function. Returning to the example decision tree in FIG. 5, node $t_2$ now has a lower asymmetric impurity than node $t_3$ since $i_A(t_2)=0.26$ and $i_A(t_3)=0.40$, due to the skew of the asymmetric impurity function. In other embodiments, the asymmetric impurity function may be any other function where $i(t)$ is more strongly correlated with $p(0|t)$ than $p(1|t)$ or vice versa.

The decision tree module 305 is designed to split the subset of the training database 230 at a parent node t so the left child node corresponds to a partition with a predominant proportion of one classification label, and the right child node corresponds to a partition with a predominant proportion of the remaining classification label. Thus, maximizing the quality function $\Delta i(s,t)$ at a split s generally corresponds to one child node having an impurity metric on a left end of the impurity function, and another child node having an impurity metric on a right end of the impurity function.

For the same impurity metric value, the asymmetric impurity function in FIG. 5B requires the partition with predominantly "0" classification label entries to have a significantly higher proportion of "0" labeled entries compared to the partition with predominantly "1" entries. For example, the decision tree module 305 may select a split with a left child node having a high proportion of "0" labeled entries, and a right child node having a less predominant proportion of "1" labeled entries. When the child nodes are leaf nodes, an external database entry assigned to the left child node will most likely have an actual classification label of "0," or in other words, the probability of misclassifying an entry that has an actual label "1" as label "0" is low, at least lower than 50%. On the other hand, an external database entry assigned to the right child node will likely have an actual classification label of "1," at least greater than 50%, but there may be a moderate probability of misclassifying an entry that has an actual label "0" as label "1." In contrast, a decision tree constructed based on the Gini impurity would generally result in similar misclassification error probabilities (i.e., 50% on average) between each classification label. Thus, the asymmetric impurity function in FIG. 5B allows construction of a decision tree that takes into account a high cost of misclassifying entries with an actual label of "1" as label "0."

Similarly to the example above, the decision tree module 305 may determine the values of a, b, c, and d in the asymmetric impurity function to accommodate different misclassification costs between the classification labels.

The RFC module 310 requests a plurality of decision trees from the decision tree module 305, generates a random forest classifier (RFC), and stores the RFC in RFC database 235, and is one means for doing so. Each of the plurality of decision trees requested by the RFC module 310 may be unique in terms of the size of the tree and attribute conditions at nodes of the tree. The RFC labels a data entry by generating a plurality of classification label estimates from each of the plurality of decision trees and determining a final label estimate based on the plurality of classification label estimates. In one embodiment, the RFC module 310 may determine the final estimate by taking the majority vote of the plurality of binary classification trees. For example, a data entry would be estimated as label "0" if over half of the plurality of binary classification trees voted "0" as the label estimate. In another embodiment, the RFC module 310 may impose different weights between each of the plurality of classification label estimates, such that a vote from one decision tree is overweighed compared other trees.

Classification Using the Trained RFC

Figure 7:
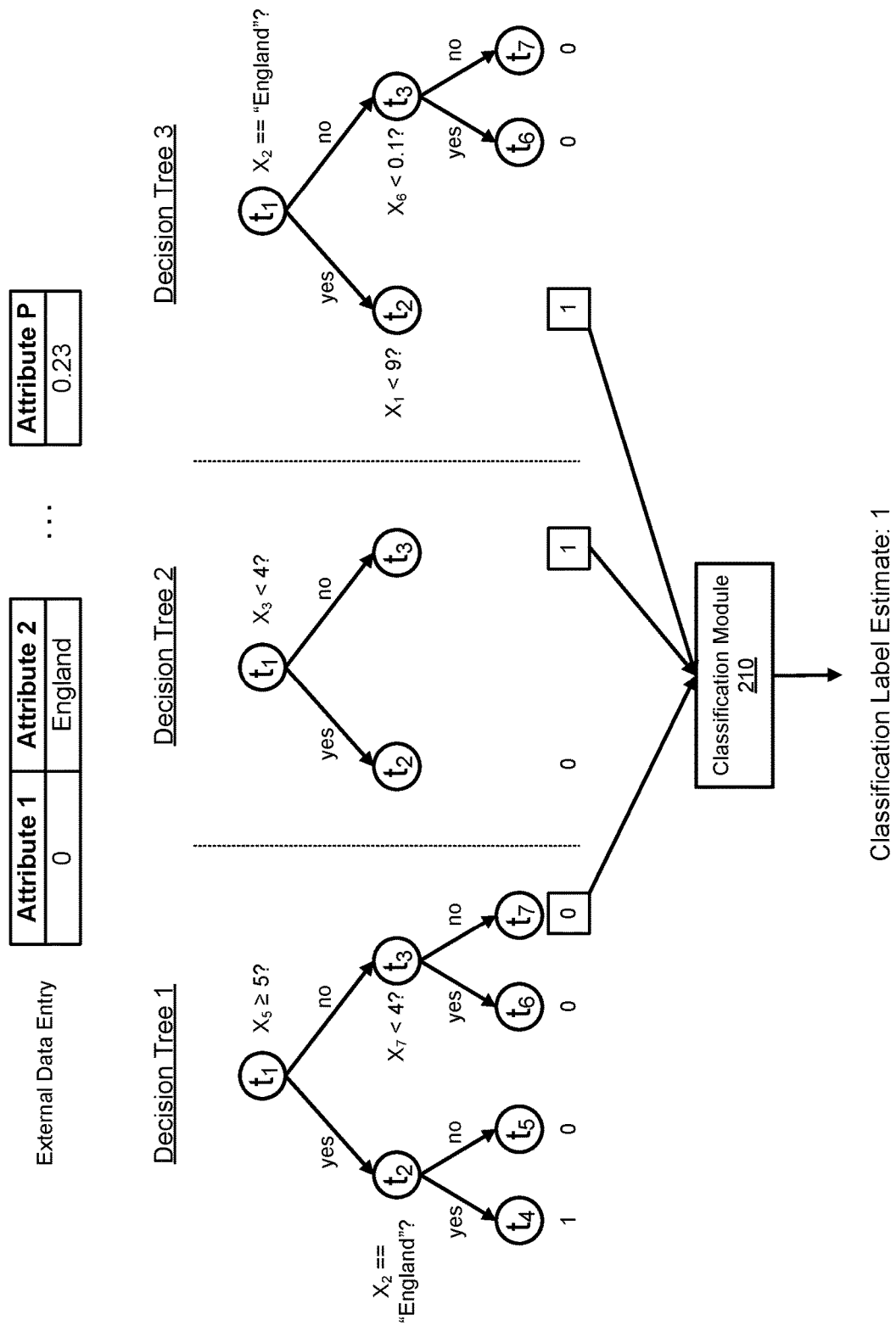
FIG. 7 illustrates classification of an external database entry by the classification module, according to one embodiment.

Returning to FIG. 3, the classification module 210 generates a classification label estimate for a given external database entry by applying the trained RFC stored in RFC database 235, and is one means for doing so. FIG. 7 illustrates classification of an external database entry by the RFC module, according to one embodiment. The example RFC shown in FIG. 7 has three different decision trees, in terms of the number of nodes and selected attribute conditions. The classification module 210 generates a plurality of classification label estimates from the plurality of decision trees by applying each decision tree to the external database entry. For example, as shown in "Decision Tree 1," selected attribute conditions are checked at each node as the external data entry propagates through the tree to a destination leaf node $t_7$. The classification label "0" associated with the destination leaf node $t_7$ is selected as the classification label estimate for "Decision Tree 1." The classification module 210 aggregates the label estimates for each tree and generates a final estimate depending on the voting method in the trained RFC. As shown in FIG. 7, the classification module 210 generates an estimate of "1," since the majority of the decision trees voted a label estimate of "1."

Fraud Example Use Case

The behavior detection module 110 may be used in the context of user fraud, in which a classifier is used to determine whether a user of a computing system is fraudulent or not. For example, in a website where users generate financial transactions between each other in exchange for products and services, fraud may occur in the form of identity theft, in which a fraudulent user inappropriately accesses another user's account information, rental fraud, in which a fraudulent user requests a monetary sum upfront without providing the product or service later on, in addition to many others.

An entity running the transaction website may apply the behavior detection module 110 to determine whether a user is fraudulent given a series of attributes associated with the user that are relevant indicators of fraud. For example, such attributes may be whether the user has previously committed fraud, number of accounts associated with the user, reviews of the user by other user's on the website, etc. However, misclassification costs of a classifier that flags fraudulent users may be severely asymmetrical. For example, classifying a non-fraudulent user as a fraudulent user may cause the entity to suspend the account of the user until the user is re-verified. Such an action would cause a major loss for the user, especially if he or she was significantly dependent on the website for financial support. In contrast, classifying a fraudulent user as a non-fraudulent user may cause an additional account of fraud, but may be less costly in terms of cost consequences for users on the website.

In the example above with asymmetric misclassification costs, the behavior detection module 110 with an asymmetric impurity function may prove useful by biasing the classifier to decrease the misclassification rate of classifying non-fraudulent users as fraudulent users, compared to that when using a classifier constructed based on a symmetric impurity function.

Implementation Example

```
# in file scikit-learn/sklearn/tree/_tree.pyx
cdef class Custom(ClassificationCriterion):
    cdef double node_impurity(self) nogil:
        """Evaluate the impurity of the current node, i.e.
            the impurity of samples[start:end]."""
        cdef double weighted_n_node_samples =
            self.weighted_n_node_samples
        cdef SIZE_t n_outputs = self.n_outputs
        cdef SIZE_t* n_classes = self.n_classes
        cdef double* custom_0s = self.custom_0s
        cdef SIZE_t custom_0s_n = self.custom_0s_n
        cdef double custom_0s_step = self.custom_0s_step
        cdef double* custom_1s = self.custom_1s
        cdef SIZE_t custom_1s_n = self.custom_1s_n
        cdef double custom_1s_step = self.custom_1s_step
        cdef SIZE_t label_count_stride =
            self.label_count_stride
        cdef double* label_count_total =
            self.label_count_total
        cdef double gini = 0.0
        cdef double total = 0.0
        cdef double tmp
        cdef double prob
        cdef double scr
        cdef SIZE_t k
        cdef SIZE_t c
        for k in range(n_outputs):
            gini = 0.0
            for c in range(n_classes[k]):
                tmp = label_count_total[c]
                prob = tmp / weighted_n_node_samples
                scr = (1.0 - prob) * prob
                if c == 0:
                    scr = custom_0s[rnd(prob /
                        custom_0s_step)]
                if c == 1:
                    scr = custom_1s[rnd(prob /
                        custom_1s_step)]
                gini += scr
            total += gini
            label_count_total += label_count_stride
        return total / n_outputs
    cdef void children_impurity(self, double*
            impurity_left, double* impurity_right) nogil:
        """Evaluate the impurity in children nodes, i.e.
            the impurity of the left child
            (samples[start:pos]) and the impurity the
            right child (samples[pos:end])."""
        cdef double weighted_n_node_samples =
            self.weighted_n_node_samples
        cdef double weighted_n_left = self.weighted_n_left
        cdef double weighted_n_right =
            self.weighted_n_right
        cdef SIZE_t n_outputs = self.n_outputs
        cdef SIZE_t* n_classes = self.n_classes
        cdef double* custom_0s = self.custom_0s
        cdef SIZE_t custom_0s_n = self.custom_0s_n
        cdef double custom_0s_step = self.custom_0s_step
        cdef double* custom_1s = self.custom_1s
        cdef SIZE_t custom_1s_n = self.custom_1s_n
        cdef double custom_1s_step = self.custom_1s_step
        cdef SIZE_t label_count_stride =
            self.label_count_stride
        cdef double* label_count_left =
            self.label_count_left
        cdef double* label_count_right =
            self.label_count_right
        cdef double gini_left = 0.0
        cdef double gini_right = 0.0
        cdef double total = 0.0
        cdef double total_left = 0.0
        cdef double total_right = 0.0
        cdef double tmp
        cdef double prob
        cdef double scr
        cdef SIZE_t k
        cdef SIZE_t c
        for k in range(n_outputs):
            gini_left = 0.0
            gini_right = 0.0
            for c in range(n_classes[k]):
                tmp = label_count_left[c]
                prob = tmp / weighted_n_left
                scr = (1.0 - prob) * prob
                if c == 0:
                    scr = custom_0s[rnd(prob /
                        custom_0s_step)]
                if c == 1:
                    scr = custom_1s[rnd(prob /
                        custom_1s_step)]
                gini_left += scr
                tmp = label_count_right[c]
                prob = tmp / weighted_n_right
                scr = (1.0 - prob) * prob
                if c == 0:
                    scr = custom_0s[rnd(prob /
                        custom_0s_step)]
                if c == 1:
                    scr = custom_1s[rnd(prob /
```

```
            custom_1s_step)]
        gini_right += scr
        total_left += gini_left
        total_right += gini_right
        label_count_left += label_count_stride
        label_count_right += label_count_stride
    impurity_left[0] = total_left / n_outputs
    impurity_right[0] = total_right / n_outputs
```

OTHER CONSIDERATIONS

In the behavior detection module 110, the program code and modules implementing the functionality described herein are not native components of underlying machine or system, and thus extend the operations and functionality thereof beyond their generic functions and capabilities. The behavior detection module 110 includes a training database 230, a RFC database 235, impurity functions 335, and decision trees 330. Those of skill in the art will appreciate that these databases, information, and data structures are not components of a generic database, and that the behavior detection module 110 may contain other databases that are not explicitly mentioned here. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for classifying database entries with asymmetric misclassification costs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method comprising:
   accessing an external data entry comprising a set of attributes relating to fraudulent behavior in a web application;
   accessing a trained model that is a random forest classifier (RFC) comprising a plurality of decision trees;
   applying the trained model to the external data entry to perform an assignment to a classification label estimate for the external data entry by:
      generating a plurality of label estimates for the external data entry from each of the plurality of decision trees; and
      assigning the classification label estimate based on a function of the plurality of label estimates, wherein the classification label estimate relates to whether a user of the web application is engaging in fraudulent behavior, wherein at least one node of each of the decision trees of the trained model represents a condition determined using an impurity function that comprises an asymmetry biased toward determining that the condition is not related to fraudulent behavior in the web application; and
   storing the classification label estimate in association with the external data entry in a data store.

2. The method of claim 1, wherein the asymmetry of the impurity function biases the assignment of the classification label estimate to the external data entry, such that the classification label estimate is more likely to be assigned to the external data entry compared to when at least one decision tree is constructed using a symmetric impurity function relative to the other classification labels from a set of two or more classification labels.

3. The method of claim 1, wherein the condition is determined based on:
   partitioning a training database based on a plurality of test conditions, wherein each entry in the training database is associated with a classification label, and wherein each test condition is associated with a split of the training database into a plurality of partitions;
   generating an improvement function output for each of the plurality of test conditions; and
   determining the condition that maximizes the improvement function output.

4. The method of claim 3,
   wherein the improvement function is given by $$\Delta i(s,t) = i(t) - \pi(l) \cdot i(l) - \pi(r) \cdot i(r)$$

where:
   i(t) is an output of the impurity function of the training database before partitioning the training database based on a test condition;
   $\pi(l)$ is a proportion of training database entries in a first partition associated with the test condition;

i(l) is an output of the impurity function of the training database entries in the first partition;
π(r) is a proportion of training database entries in a second partition associated with the same test condition; and
i(r) is an output of the impurity function of the training database entries in the second partition.

5. The method of claim 3, wherein the improvement function is based on the asymmetric impurity function:

$$i_A(t) = 0.25 \cdot \frac{p(0|t)^a \cdot p(1|t)^b}{\max_{[0,1]}\{p(0|t)^a \cdot p(1|t)^b\}} + 0.25 \cdot \frac{p(1|t)^c \cdot p(0|t)^d}{\max_{[0,1]}\{p(1|t)^c \cdot p(0|t)^d\}}$$

in which a, b, c, d are constants with a≠1, b≠1, c≠1, d≠1, p(0|t) is a proportion of entries in a partition with a first classification label, and p(1|t) is a proportion of entries in the partition with a second classification label.

6. The method of claim 1, wherein the classification label estimate is a label with a highest proportion in the plurality of label estimates.

7. A non-transitory computer readable storage medium comprising instructions configured to be executed by a processor, the instructions when executed by the processor causing the processor to:
access an external data entry comprising a set of attributes relating to fraudulent behavior in a web application;
access a trained model that is a random forest classifier (RFC) comprising a plurality of decision trees;
apply the trained model to the external data entry to perform an assignment to a classification label estimate for the external data entry by:
generating a plurality of label estimates for the external data entry from each of the plurality of decision trees; and
assigning the classification label estimate based on a function of the plurality of label estimates, wherein the classification label estimate relates to whether a user of the web application is engaging in fraudulent behavior, wherein at least one node of each of the decision trees of the trained model represents a condition determined using an impurity function that comprises an asymmetry biased toward determining that the condition is not related to fraudulent behavior in the web application; and
store the classification label estimate in association with the external data entry in a data store.

8. The non-transitory computer readable storage medium of claim 7, wherein the asymmetry of the impurity function biases the assignment of the classification label estimate to the external data entry, such that the classification label estimate is more likely to be assigned to the external data entry compared to when at least one decision tree is constructed using a symmetric impurity function relative to the other classification labels from a set of two or more classification labels.

9. The non-transitory computer readable storage medium of claim 7, wherein the condition is determined based on:
partitioning a training database based on a plurality of test conditions, wherein each entry in the training database is associated with a classification label, and wherein each test condition is associated with a split of the training database into a plurality of partitions;
generating an improvement function output for each of the plurality of test conditions; and
determining the condition that maximizes the improvement function output.

10. The non-transitory computer readable storage medium of claim 9, wherein the improvement function is given by $$\Delta i(s,t) = i(t) - \pi(l) \cdot i(l) - \pi(r) \cdot i(r)$$

where:
i(t) is an output of the impurity function of the training database before partitioning the training database based on a test condition;
π(l) is a proportion of training database entries in a first partition associated with the test condition;
i(l) is an output of the impurity function of the training database entries in the first partition;
π(r) is a proportion of training database entries in a second partition associated with the same test condition; and
i(r) is an output of the impurity function of the training database entries in the second partition.

11. The non-transitory computer readable storage medium of claim 9, wherein the improvement function is based on the asymmetric impurity function:

$$i_A(t) = 0.25 \cdot \frac{p(0|t)^a \cdot p(1|t)^b}{\max_{[0,1]}\{p(0|t)^a \cdot p(1|t)^b\}} + 0.25 \cdot \frac{p(1|t)^c \cdot p(0|t)^d}{\max_{[0,1]}\{p(1|t)^c \cdot p(0|t)^d\}}$$

in which a, b, c, d are constants with a≠1, b≠1, c≠1, d≠1, p(0|t) is a proportion of entries in a partition with a first classification label, and p(1|t) is a proportion of entries in the partition with a second classification label.

12. The non-transitory computer readable storage medium of claim 7, wherein the classification label estimate is a label with a highest proportion in the plurality of label estimates.

13. A system comprising:
a processor configured to execute instructions;
a computer-readable medium containing instructions for execution on the processor, the instructions causing the processor to perform steps of:
accessing an external data entry comprising a set of attributes relating to fraudulent behavior in a web application;
accessing a trained model that is a random forest classifier (RFC) comprising a plurality of decision trees;
applying the trained model to the external data entry to perform an assignment to a classification label estimate for the external data entry by:
generating a plurality of label estimates for the external data entry from each of the plurality of decision trees; and
assigning the classification label estimate based on a function of the plurality of label estimates, wherein the classification label estimate relates to whether a user of the web application is engaging in fraudulent behavior, wherein at least one node of each of the decision trees of the trained model represents a condition determined using an impurity function that comprises an asymmetry biased toward determining that the condition is not related to fraudulent behavior in the web application; and
storing the classification label estimate in association with the external data entry in a data store.

14. The system of claim 13, wherein the asymmetry of the impurity function biases the assignment of the classification label estimate to the external data entry, such that the classification label estimate is more likely to be assigned to the external data entry compared to when at least one decision tree is constructed using a symmetric impurity function relative to the other classification labels from a set of two or more classification labels.

15. The system of claim 13, wherein the condition is determined based on:
- partitioning a training database based on a plurality of test conditions, wherein each entry in the training database is associated with a classification label, and wherein each test condition is associated with a split of the training database into a plurality of partitions;
- generating an improvement function output for each of the plurality of test conditions; and
- determining the condition that maximizes the improvement function output.

16. The system of claim 15, wherein the improvement function is based on the asymmetric impurity function:

$$i_A(t) = 0.25 \cdot \frac{p(0|t)^a \cdot p(1|t)^b}{\max_{[0,1]}\{p(0|t)^a \cdot p(1|t)^b\}} + 0.25 \cdot \frac{p(1|t)^c \cdot p(0|t)^d}{\max_{[0,1]}\{p(1|t)^c \cdot p(0|t)^d\}}$$

in which a, b, c, d are constants with $a \neq 1$, $b \neq 1$, $c \neq 1$, $d \neq 1$, $p(0|t)$ is a proportion of entries in a partition with a first classification label, and $p(1|t)$ is a proportion of entries in the partition with a second classification label.

17. The system of claim 13, wherein the classification label estimate is a label with a highest proportion in the plurality of label estimates.

* * * * *